Dec. 25, 1951     H. D. YODER     2,579,719

HIGH-PRESSURE LIQUID LEVEL GAUGE

Filed Nov. 21, 1949

INVENTOR.
HOWARD D. YODER
BY
*Whittemore Hulbert & Belknap*

ATTORNEYS

Patented Dec. 25, 1951

2,579,719

UNITED STATES PATENT OFFICE 2,579,719

HIGH-PRESSURE LIQUID LEVEL GAUGE

Howard D. Yoder, Farmington, Mich., assignor, by mesne assignments, to Buffalo-Eclipse Corporation, a corporation of New York Application November 21, 1949, Serial No. 128,637

3 Claims. (Cl. 73—330)

The invention relates to liquid level gauges designed for use under extremely high pressures.

It is the object of the invention to obtain a construction which will withstand such high pressures and will also remain operative under great fluctuation in pressures.

To this end the invention consists in the construction as hereinafter set forth.

Figure 1:
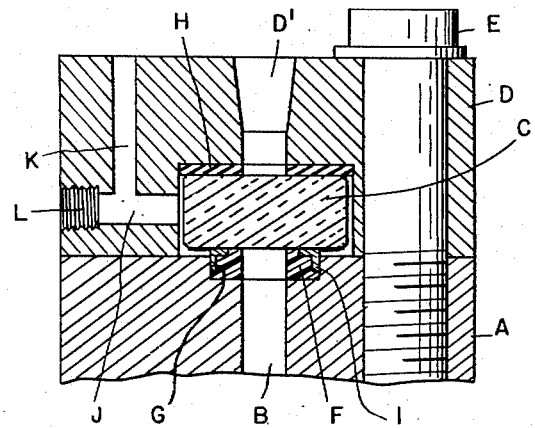
Fig. 1 is a cross section through a gauge of my improved construction.
Figure 2:
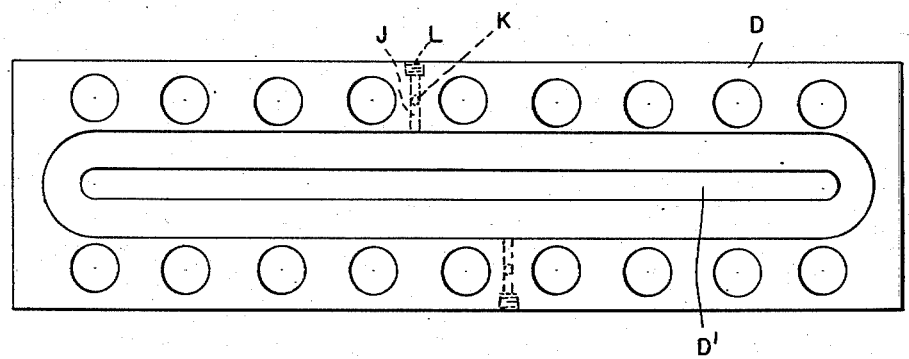
Fig. 2 is an elevation of the cap member of the gauge partly in section to show the venting means therefor.

A is the casing forming the body of the gauge and which is provided with the vertically extending open slots B therein. C is a transparent panel, usually formed of heavy plate glass, which covers the slot B. D is a cap member which substantially encloses the panel C but is provided with an observation slot D' in registration with the slot B. The cap D is rigidly secured to the body by bolts E which clamp its inner face against the outer face of said body.

To effectively seal the joint between the panel C and the body, a gasket F is placed in a recess G which completely surrounds the slot B. This gasket is formed of plastic material which is compressed when the panel C is clamped down against the same by the cap D, a second gasket H being placed between the cap and the outer face of the panel. The parts are so proportioned that when the cap is clamped against the member A, the gasket will be compressed so that the panel C is nearly in contact with the face of said member A. However, under very high pressure the outer gasket H may be further compressed and the panel moved to form a crevice between the same and the member A. This might permit extrusion of the gasket F through said crevice, but such effect is prevented by a rigid angle member I at the upper outer edge of the gasket and carried thereby, which closes any such crevice. Thus the gasket is held against outer displacement, but under certain conditions it might be displaced inwardly so as to break the seal. The reason for this is that the panel C is located in a closed chamber formed by the cap D and member A, and the gasket H seals this chamber. Such construction is desirable as a safety measure which, in case the glass should at any time be shattered, will hold the fragments from being scattered in all directions confining their path to the visibility opening. A further advantage is that the contact of the under face of the cap with the outer face of the member A, and clamping it by the bolts in such position, holds the central portion of said cap, in which the slot D' is located, from being bent upward. There is, however, one detrimental effect resulting from the enclosing of the panel viz., if any gas should leak by the gasket H, it would be trapped in the chamber and if the internal pressure in the gauge should be suddenly released (as is frequently the case in practice) the high pressure in the chamber might blow the gasket inward and destroy its seal. With my improved construction, I have avoided this defect by providing a vent passage which is always in open communication with the chamber in which the panel C is located. This passage is preferably formed by intersecting bores J and K formed in the cap member D, the one communicating with the chamber containing the panel and the other extending through the outer surface of the cap. The outer end of the bore J is closed by a screw plug L so that the vent passage is non-rectilinear. This, while providing free communication with the external atmosphere, is not a rectilinear passage for glass fragments in case of breakage. Also the direction of the outer portion of this passage is parallel to that of the visibility opening and will thus prevent scattering of glass laterally. As shown I have provided two of such vent passages on opposite sides of the cap so as to provide free vent for all portions of the chamber within which the panel C is located. Thus even if the pressure within the gauge is dropped to that of atmosphere, there will be no tendency to blow the gasket H inward.

What I claim as my invention is:

1. In a high pressure liquid level gauge, an apertured body portion, a transparent panel covering said aperture, a gasket between said panel and body for sealing about said aperture, a cap chambered to receive and substantially enclose said panel and gasket but having a sight opening and also a non-rectilinear vent passage therein, and means for clamping said cap against said panel and body to form a chamber about a portion of said panel which is vented by said passage.

2. In a high pressure liquid level gauge, an apertured body portion, a transparent panel covering said aperture, a gasket between said panel and body for sealing about said aperture, a cap chambered to receive and substantially enclose said panel and gasket but having a sight opening and also a non-rectilinear vent passage therein, a gasket between said panel and cap which seals about said sight opening, and means for clamping said cap against said panel and body portion to form an enclosing chamber about a portion of said panel which is vented by said passage.

3. In a high pressure liquid level gauge, a body portion having an elongated slot therein, a transparent panel covering said slot, a gasket between said panel and body for sealing about said slot, a cap chambered to receive said panel and substantially enclose the same and said gasket but having a sight opening and also a non-rectilinear vent passage therein, a gasket between said panel and cap which seals about said sight opening, and means for clamping said cap against said panel and body portion exerting high pressure upon said gaskets and forming an enclosing chamber about a portion of said panel which is vented by said passage.

HOWARD D. YODER.

REFERENCES CITED

The following references are of record in the file of this patent:

FOREIGN PATENTS

| Number | Country | Date |
| --- | --- | --- |
| 21,733 | Great Britain | Oct. 2, 1906 |
| 109,911 | Switzerland | May 16, 1925 |